United States Patent [19]

Laussermair et al.

[11] 3,731,367
[45] May 8, 1973

[54] METHOD OF ASSEMBLYING COMPOUND BODY

[75] Inventors: Friedrich Laussermair, Karl Motz, both of Munich, Germany

[73] Assignee: Maschinenfabrik Augsburg-Nurnberg Aktiengesellschaft, Munich, Germany

[22] Filed: Aug. 26, 1970

[21] Appl. No.: 67,100

[30] Foreign Application Priority Data

Aug. 28, 1969 Germany..............P 19 43 820.1

[52] U.S. Cl..............................29/447, 29/DIG. 35
[51] Int. Cl...............................................B23p 11/02
[58] Field of Search........................29/DIG. 35, 447

[56] References Cited

UNITED STATES PATENTS

| | | | |
|---|---|---|---|
| 1,193,667 | 8/1916 | Corey | 29/DIG. 35 UX |
| 1,727,755 | 9/1929 | Dickinson | 29/447 |
| 1,955,728 | 4/1934 | Allen et al. | 29/447 |
| 1,980,156 | 11/1934 | Emrick | 29/447 |
| 2,027,961 | 1/1936 | Currie | 29/447 UX |
| 3,345,732 | 10/1967 | Brower | 29/447 X |

*Primary Examiner*—Charlie T. Moon
*Attorney*—Francis D. Stephens and Hugo Huettig, Jr.

[57] ABSTRACT

An outer cylindrical body composed of a fiber reinforced thermal setting synthetic resin and a cylindrical inner metal body are separately immersed in a bath of cyrogenic liquefied inert gas. The metal body shrinks and is then inserted in the outer body. Upon being removed from the bath and heated, the metal body expands and becomes firmly bonded to the outer body to form the compound body.

2 Claims, 1 Drawing Figure

PATENTED MAY 8 1973    3,731,367
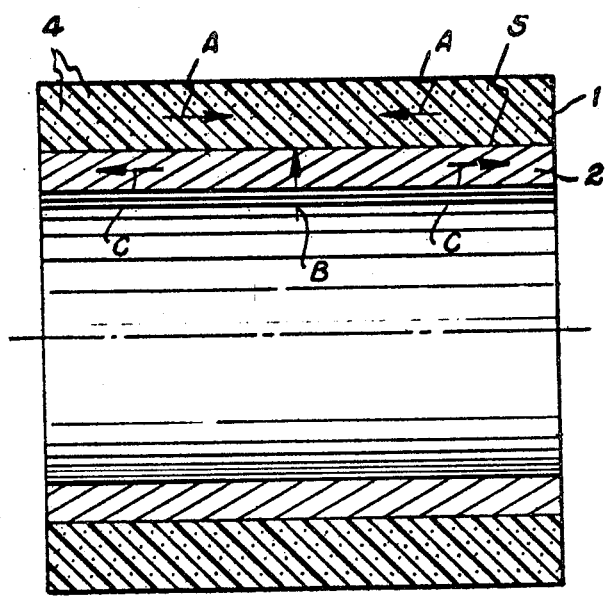

METHOD OF ASSEMBLYING COMPOUND BODY

This invention relates to a method for producing compound bodies having high strength and bending resistance and low weight. The bodies consist of an outer body composed of a crosslinked synthetic polymer which is capable of being heat hardened or thermal set. In particular, epoxy resins are used which are reinforced by means of extremely firm fibers which do not significantly expand in their longitudinal direction when heated, and an inner metal body coaxial and concentric with the outer body and which has a high elasticity and a high ratio of strength to specific weight. The inner and outer bodies are joined to one another so that they are, for practical purposes, a single body insofar as their strength is concerned.

In practice, compound bodies of this type are used where structural parts which are extremely solid and having a low weight are required. Such requirements are especially found in high speed centrifugal rotors.

Heretofore, centrifugal rotors have been made of a synthetic material reinforced with fiberglass in order to eliminate the inner metal tube body which is stiff with regard to flexural torque. The fiberglass reinforced synthetic material was formed by winding it around a shaft in axial and circumferential directions. However, it was found that such fiberglass reinforced synthetic materials reproduced in this manner did not have the strength and bending resistance required in order to withstand the high speed rotation of greater than 450 m/s.

Also used for centrifugal rotors are rotors composed of compound bodies in which the inner metal tube having a high degree of stiffness is concentrically enclosed by a fiberglass reinforced synthetic material tube.

Recently, so-called duro-plastics such as epoxy resins which are thermal setting have been tried with the synthetic material being reinforced by carbon fibers which, in addition to being of high strength and low specific weight, have the characteristic feature of expanding quite extensively transversely and slightly shortened longitudinally when heated.

Such known compound rotors have been produced by winding the sheathing of carbon fiber reinforced synthetic material (CKF) around a metal tube on which is an adhesive layer and then thermal setting the synthetic material.

Because of the various high coefficients of expansion of the components used which range when metal is used from 11 $25 \times 10^{-6}$ [°C$^{-1}$], when carbon fibers are used in a longitudinal direction $-1 \times 10^{-6}$ [°C$^{-1}$], in transverse direction $25 \times 10^{-6}$ [°C$^{-1}$], and when synthetic resin is used $60 \times 10^{-6}$ [°C$^{-1}$], considerable difficulties are encountered relative to the expansion in the longitudinal direction.

All the materials in the compound body when thermal set or heat hardened expand according to their coefficient of expansion, so while the material or resin is hardened, it is still viscous enough so that the longitudinal expansion does not incur an increase of inherent tension.

It is especially observed that the radial expansion of the inner metal body or tube is only partially resisted by the fiber reinforced synthetic material wound about the tube since the fibers are not as yet finally set with regard to their position. The metal tube expands both radially and axially while the outer body remains the same radially and expands only axially or longitudinally.

When the compound body is cooled from the high temperature heat hardening, it is clear that the inner metal tube contracts radially while the outer body remains unchanged. The adhesive layer between the metal tube and outer body is therefor subject to tension stress which means a partial or complete loosening of the joint between the inner and outer bodies.

With regard to the longitudinal or axial direction, the conditions are completely reversed since the coefficients of heat expansion of the outer body of wound fibers is greater than that of the inner metal body. In other words, the outer body shrinks to a much greater extent while being cooled and thus subjects the intermediate adhesive layer with an additional stress.

These expansion and contraction relationships mean that when the adhesive layer does not withstand the tension and compression stresses, there is produced an inherent condition of tension which, because of the tension in the outer body, lead during operation to tears in the outer body of synthetic resin either directly or because of an added bending stress. In a second case, when the permissible radial tension between the inner metal tube body and the outer body are exceeded, this causes a partially localized or a complete loosening of the bodies with one another. Both occurrences are disadvantages which cannot be tolerated in a compound body for reasons of safety and especially when the compound bodies are used as high speed centrifugal rotors.

The object of this invention is to produce an extremely solid compound body which is stiff with respect to flexural torque and to produce a compound body composed of metal and synthetic materials which are capable of being heat hardened and thermal set and are reinforced with fibers and to produce a compound body which, at the same time, is suitable for high speed rotation and having a safe bonding between the inner and outer bodies during operation, especially with regard to temperature changes, speed and mechanical stresses.

In general, these objects are obtained in that the fiber reinforced synthetic material is formed by winding the same on a non-deformable shaft and then heat hardened or thermal set and then removed from the shaft. The metal body is at a low temperature inserted into the synthetic material fibrous body so that during the subsequent heating up to room temperature or operational temperature and due to the varying high coefficients of expansion of the metal and of the outer carbon fiber reinforced material, there are produced in the outer synthetic material body compression stresses in the axial and longitudinal direction and tension stresses in the radial direction by means of which there is achieved between the metal body and the synthetic material body in all and every operating condition of the compound body a bond between the inner and outer bodies so that in regard to their strength and form they are, for all practical purposes, one single compound body.

A further feature of the invention is in that the metal body is inserted into the outer cylindrical body of synthetic fiber reinforced material in a bath of cryogenic liquefied inert gas at a very low temperature.

Another essential feature of this invention is in that the synthetic material outer body is reinforced with carbon fibers and that the metal body is composed of titanium, beryllium, aluminum alloys or an extremely solid and firm steel.

The outer synthetic material body, after being heat hardened is submerged in a cryogenic bath wherein its diameter remains constant but where its length is substantially shortened. The metal body is separately placed in the bath of cold liquefield gas and contracts radially so that it shrinks and when concentrically inserted in the outer body leaves a space between the metal inner body and the synthetic material outer body.

When taken from the bath and during the heating up of the now compound body to room or operational temperature, there are produced in the inner and outer bodies changes in the radial as well as in the axial or longitudinal direction. The metal body according to its coefficient expansion expands and thus comes into contact with the outer body in which, because of its unchanged diameter, are produced radial tension stresses.

Due to the different high coefficients of heat expansion of the metal body and the coefficient of expansion of a synthetic material outer body, the result is that when warmed from the low temperature of the bath the synthetic material of the compound body expands very much in the longitudinal direction while the metal body expands less in the same direction.

This expansion of the two materials occurs to the law of linear expansion until no intermediate space and thus no play exists between the inner metal tube body and the synthetic outer body (CFK) reinforced with carbon fibers. When the outer surface of the metal inner body comes in contact at a certain temperature with the inner surface of the carbon reinforced synthetic material outer body (CFK), a condition is achieved in which the friction forces, that is, the pressure between the metal body and the outer synthetic material body is greater than the shear stress which the outer body expanded more in the longitudinal direction would have to exercise in order to tear itself away or slide from the inner metal body which is now perfectly fitted inside the outer body.

The lengthwise or longitudinal expansion of the carbon reinforced synthetic material (CFK) outer body is limited to the axially lengthwise expansion of the metal body so that both bodies experience upon an increase in temperature a uniform expansion to an identical length. Thus with this lengthening procedure there is obtained a condition of inherent stresses in which compression occurs in an axial direction in the outer body and tension in the concentric inner metal body. In addition, the metal body presses in a radial direction against the outer cylindrical body of synthetic material which maintains a constant diameter at all temperatures occurring during operating conditions of the compound body.

The great advantage of the compound body of this invention lies in that the bond between the metal body and the carbon fiber reinforced synthetic material (CFK) outer body prevails under all conditions with regard to strength and form. Because of the axial compression stress retained in the carbon fiber synthetic material (CFK) outer body, the compound body can be subjected to tension and bending stresses without running the risk that transverse tears will occur.

The compound body of this invention is not only suitable for cylindrical rotors for high speed centrifuges but also for those techniques in which requirements are made for structural parts having a high strength and a low structural weight, for example, parts for a pressure container and for motor vehicles. Since the wound synthetic material of the outer body can be shaped to almost any form, the designer of a part can select a profile and cross-section for the compound body. The compound body of this invention has an important place in the construction of rotors for high speed centrifuges because it guarantees a safe operation during the highest r.p.m.

The means by which the objects of the invention are obtained are described more fully with reference to the accompanying drawing which is a longitudinal cross-section of a cylindrical compound body.

The cylindrical carbon fiber reinforced synthetic material (CFK) outer body 1 encloses a metal cylindrical inner metal body 2 concentrically and coaxially inserted within the outer body. The inner body 2 is bonded on the joint line 3 of the contacting surfaces of the bodies strongly and undeformed. The outer body contains reinforcing carbon fibers 4 laid circumferentially in the outer body as indicated by the few dots in the drawing.

The arrows indicate the stresses inherent in the compound body which come into existence at room or operational temperatures. In the outer carbon fiber reinforced synthetic material (CFK) body 1, the stresses are axial compression stresses A. Radial tension stresses B are produced by the bond between the bodies. In the inner metal body there are tension stresses C.

The coefficients of expansion of the materials used in the materials forming the compound body are as follows:

| | Coefficient of expansion $.10^{-6}$ (°C$^{-1}$) |
|---|---|
| Epoxy resin | 60 |
| Carbon Fiber | Transverse: 25 |
| | Lengthwise: —1 |
| Titanium | 2.5 |
| Beryllium | 12.3 |
| Aluminum alloys | 23 |
| Steel | 11 |

In the making of a typical compound body of this invention, the carbon fiber reinforced outer body composed of an epoxy resin was heat hardened at a minimum temperature of 110° C (230° F) and preferably at a temperature of 165° C (329° F). This outer body was then separately inserted together with the inner metal body in a bath of liquefied nitrogen having a temperature of −195.8° C (−293° F). About at that temperature, the inner metal body was inserted into the outer body. Both bodies, metal and resin, are supercooled at this temperature. If only the metal body is supercooled, the desired stresses in an axial direction would not be possible in the completed compound body.

Though the coefficients of expansion of the individual components differ, the method of making the compound body according to this invention remains on the same principle.

Having now described the means by which the objects of this invention are obtained,

We claim:

1. In a method of producing a compound body having high strength, stiff against bending and low specific weight comprising forming an outer body composed of a heat hardened cross-link polymer epoxy resin reinforced by carbon fibers which do not substantially expand longitudinally when heated, and an inner coaxial and concentric metal body having high elasticity and high strength ratio to specific weight, the improvement comprising first independently forming the outer body and the inner body, immersing each body in a bath of inert cryogenic liquid gas to shrink said inner metal body, inserting the shrunk inner metal body within said outer body, and then withdrawing the thus formed compound body from said bath and heating it to ambient temperature to produce stresses firmly binding the outer body to the inner body.

2. A method as in claim 1 in which said metal body is composed of a metal selected from the group consisting of titanium, beryllium, aluminum alloys, and high strength steel.

* * * * *